No. 735,361. PATENTED AUG. 4, 1903.
H. L. GANTT & F. W. TAYLOR.
METHOD OF DETERMINING AND REGULATING THE TEMPERATURE
OF HEATED ARTICLES OR RECEPTACLES.
APPLICATION FILED OCT. 21, 1899.
NO MODEL. 2 SHEETS—SHEET 1.
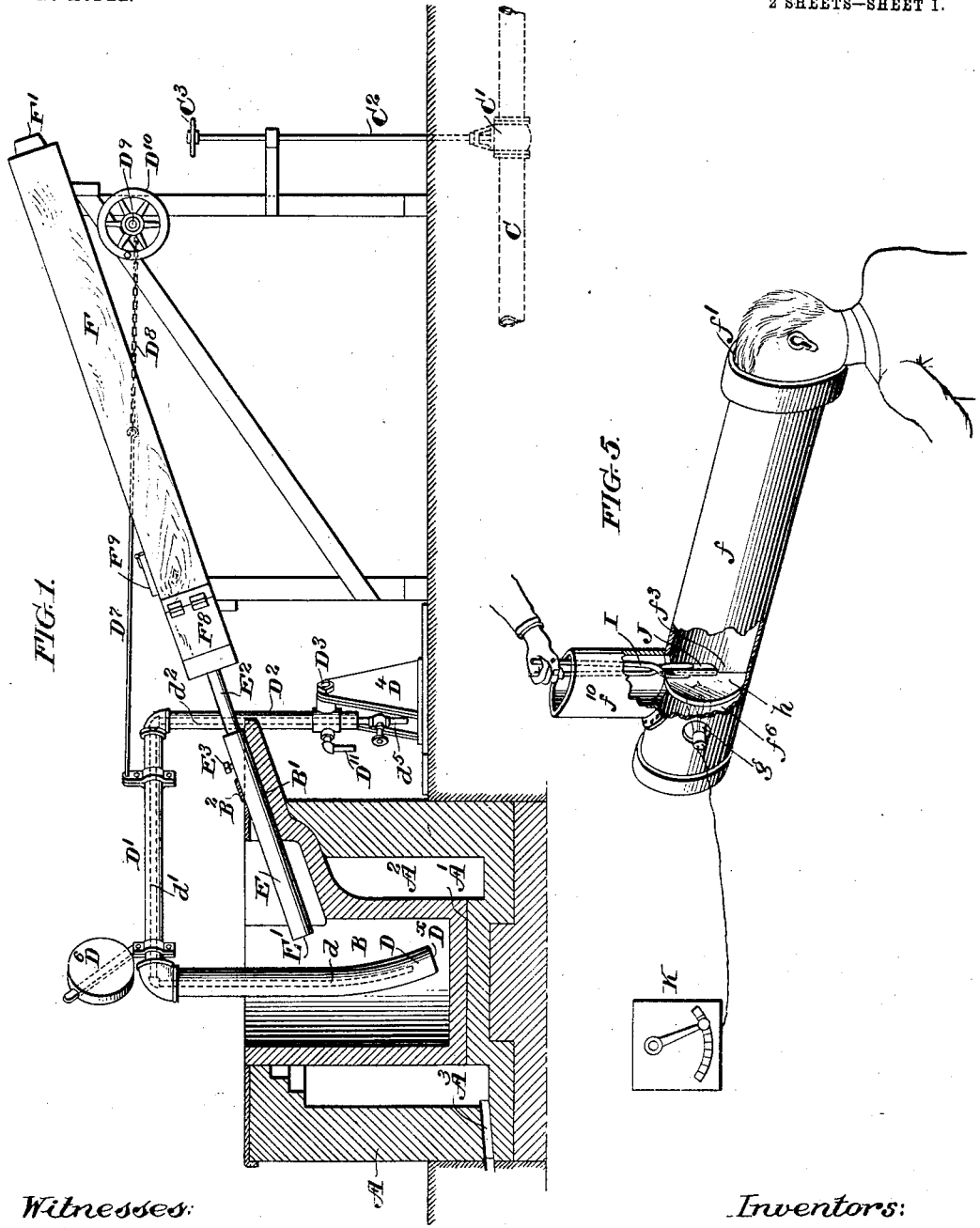

No. 735,361. PATENTED AUG. 4, 1903.
H. L. GANTT & F. W. TAYLOR.
METHOD OF DETERMINING AND REGULATING THE TEMPERATURE
OF HEATED ARTICLES OR RECEPTACLES.
APPLICATION FILED OCT. 21, 1899.
NO MODEL. 2 SHEETS—SHEET 2.
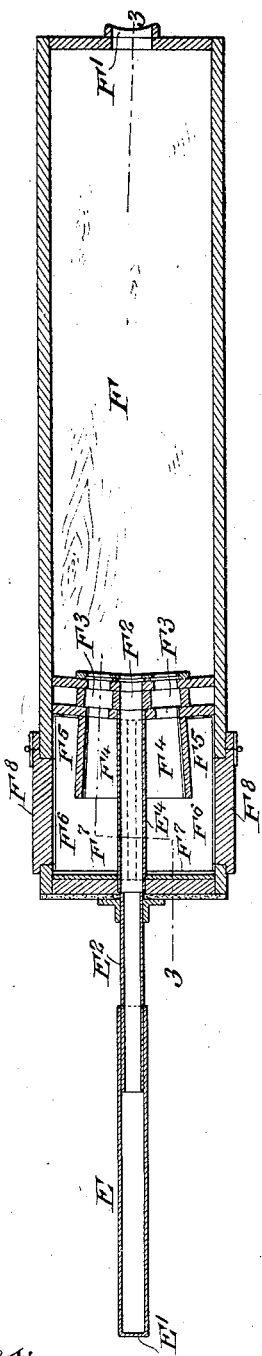
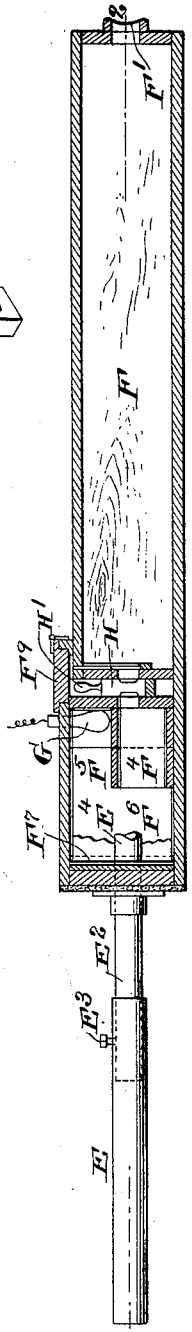
Witnesses:
Inventors:
Henry L. Gantt
Frederick W. Taylor
by their atty.

No. 735,361. Patented August 4, 1903.

UNITED STATES PATENT OFFICE.

HENRY L. GANTT AND FREDERICK W. TAYLOR, OF SOUTH BETHLEHEM, PENNSYLVANIA, ASSIGNORS, BY MESNE ASSIGNMENTS, TO MORSE THERMO-GAGE CO., OF TRUMANSBURG, NEW YORK.

METHOD OF DETERMINING AND REGULATING THE TEMPERATURE OF HEATED ARTICLES OR RECEPTACLES.

SPECIFICATION forming part of Letters Patent No. 735,361, dated August 4, 1903.

Application filed October 21, 1899. Serial No. 734,289. (No model.)

*To all whom it may concern:*

Be it known that we, HENRY L. GANTT and FREDERICK W. TAYLOR, citizens of the United States of America, residing in South Bethlehem, in the county of Northampton, in the State of Pennsylvania, have invented a certain new and useful Improvement in Methods of Determining and Regulating the Temperature of Heated Articles or Receptacles, of which the following is a true and exact description.

Our invention relates to a new method of determining the temperature of a heated article, chamber, or receptacle, and of regulating such temperature to a determined standard, and is particularly useful in carrying out the processes of annealing, tempering, or the like, where it is desirable that the substances undergoing treatment should be heated to a uniform temperature in order that they may all be affected by the treatment in the same degree. While our method may be utilized for determining the exact temperature of the article or chamber, it is particularly adapted for ascertaining whether or not a certain determined temperature has been reached and for regulating the temperature to such determined point.

Essentially our method consists in comparing the color and intensity of light emitted from a highly-heated substance with the color and intensity of the light emitted from an object or medium, the color of which emitted light has an ascertained relation to the temperature and appears to the operator to be the same as that of the emitted light from the substance under observation when such substance is at a certain predetermined temperature.

While our method can be successfully practiced in many cases by directly observing the tool or other object being treated in comparison with the emitted light of the standardized medium, it is most usefully employed for ascertaining the temperature of a furnace-chamber or fused metallic bath, in which the tool or other object undergoing treatment is heated, and in such case we prefer to carry our process into operation by inserting in the chamber or receptacle the closed end of a tube, which is raised to the temperature of the chamber, such temperature being ascertained by observing the color and intensity of the light emitted by the heated end of the tube through the open end of the tube and in comparison with the emitted light from the standardized medium, and our method is particularly useful in the last-mentioned modification when used in connection with means whereby the temperature of the chamber or bath can be regulated so as to bring it gradually into exact accordance with the light of the standardized medium which corresponds to the desired temperature. We will, however, note here that while the standardized medium employed in our method may be an incandescent body, such as a carbon filament brought to incandescence by the electric current, we greatly prefer to use for purposes of comparison light transmitted through and emitted from a translucent medium—such, for instance, as colored glass—though for practical purposes we employ and recommend as such translucent medium a colored solution, because by the skilful use of soluble coloring material such solution can be given almost any desired color and can also have their translucency so regulated as to nicely regulate the intensity as well as the color of the light.

Our method depends upon the fact that when substances, particularly metals, are heated above a certain limit they emit colored light, which changes as the temperature increases or decreases, the color and intensity of the light varying with an exact relation to the temperature, so that the appearance of the heated object affords at all times a perfectly accurate means of determining its temperature, provided only the relationship of the colored light to temperature is known. It being ascertained, therefore, that steel, for instance, at a certain temperature emits a light of a certain color and quality, it is possible to ascertain with exactness when steel has reached that point by observing it in comparison with a standardized colored light known to correspond with a determined temperature. Furthermore, if variously-colored lights are employed for purposes of comparison, which are capable of being varied or brought successively into view at the will of the operator, it is obvious that the temperature of the steel can be ascertained by observing with which standardized colored light it corresponds. While, however, the relationship of colored light emitted from heated objects to temperature is well understood in the art, the observation of the color of heated articles as a means of ascertaining their temperature has depended, as heretofore practiced, upon the experience and memory of trained observers and has therefore been little better than a rule of thumb, for while it has been attempted to provide a visual scale consisting of strips of colored paints or inks and bearing an approximate relationship to the heat colors such scales are far from accurate and, among other reasons, primarily, because the colored light reflected from them entirely lacks the glowing appearance characteristic of incandescent bodies, and is therefore of a quite different character from the emitted light given out by the heated object to be observed.

We have discovered that colored light emitted directly from a heated object, or, preferably, light emitted by transmission through a translucent colored medium bears a closer relationship to the heat colors than any lights reflected from colored surfaces and that by comparing such emitted lights with the lights of the heated object under treatment by bringing both lights simultaneously to the eye the colors will be so exactly of the same character that the colored heat of the object under treatment can be accurately determined even by comparatively unskilful and inexperienced observers, and, as heretofore indicated, our invention, broadly speaking, consists in comparing the color and quality of the light emitted from a highly-heated object the temperature of which is to be ascertained with the glowing colored light emitted from a standardized medium and simultaneously brought into vision.

It is to be noted that our method depends upon a comparison of the color of the emitted lights as well as upon a comparison of light intensity or the amount of illumination.

We are aware that pyrometers have been constructed in which provision is made for a comparison between the light emitted from an object highly heated and a light or lights of standardized intensity, from both of which lights the element of color is eliminated; but this method is open to several objections and cannot compare in reliability or in ease of observation with our method, based primarily on a comparison of color in the light emitted from the object under observation and a standardized medium.

Reference is now had to the drawings, in which we have illustrated apparatus suitable for the practice of our method, and in which—

Figure 1 is a side elevation, partly in section, of a lead-bath provided with means for heating and cooling its contents and with a pyrometer embodying our method in what we believe to be its best form of application. Fig. 2 is a horizontal section through the pyrometer, taken as on the line 2 2 of Fig. 3. Fig. 3 is a vertical section through the pyrometer on the irregular line 3 3 of Fig. 2. Fig. 4 is a perspective view of the bottle which we use in connection with the pyrometer to contain the colored translucent medium; and Fig. 5 is a perspective view of a modified form of pyrometer, also adapted for use with our method.

A indicates the furnace-chamber, having a platform $A'$ at its bottom, upon which is supported a lead-pot, (indicated at B,) $A^2$ indicating the flue passing around the lead-pot from a furnace (not shown) to a stack. (Also not shown.)

$A^3$ indicates a vent for the escape of lead in case of the breakage of the lead-pot.

The lead-pot B is made, as shown, with a lateral extension $B'$ to give support and ready entrance to the tube E, hereinafter described, $B^2$ indicating a clamp for holding the tube E in position.

C indicates an air-blast pipe leading to the furnace, (not shown,) $C'$ indicating a regulating-valve, $C^2$ a valve-stem, and $C^3$ a hand-wheel for operating the stem and valve.

D $D'$ $D^2$ indicate pipes constituting a conduit, the end $D^\times$ of the pipe D being closed and the angular system of conduits being pivoted at $D^3$ upon standards $D^4$ and connected with an escape-pipe $D^{11}$, as shown. $d$ $d'$ $d^2$ indicate a pipe system of smaller diameter, passing through the pipes $D'$ $D^2$ and connecting with a water-supply pipe $d^5$. The water being turned on passes through the pipes $d^2$ $d'$ $d$ into the end of the pipe D, thence back through said pipe D, through pipes $D'$ and $D^2$, to the outlet $D^{11}$.

$D^6$ is a weight tending to hold the pipes in the position shown in Fig. 1; $D^7$, a rod connecting with a chain $D^8$, which winds on a spindle $D^9$, turned by a hand-wheel $D^{10}$, and by means of which the pipe system can be rocked backward on its pivot $D^3$ and withdrawn in whole or in part from the lead-pot B.

E is a closed ended tube projecting into the melted lead in the pot B and having its open end projecting outside of said lead, as shown.

$E'$, Fig. 1, indicates the closed end of the tube.

$E^2$ is a tube telescoping into the open end of the pipe E and secured, as shown, to the end of the pyrometer-box F. This box has a sight-aperture $F'$ at its front end and at its rear end partitions, in which are formed a central aperture or chamber $F^2$, in line with the pipes $E^2$ and E and connected therewith by a separate pipe-section $E^4$. On each side of this central aperture are lateral apertures or chambers $F^3$ $F^3$, to which access is afforded through the top of the box or tube by a door $F^9$. In rear of the chambers $F^3$, light-chambers $F^6$ $F^6$ are formed in the pyrometer-box, into which project shield-boxes F⁴ F⁴, at the sides of which are the chambers F⁵ F⁵, in which chambers are situated the lights, which may be conveniently incandescent electric lights G, as shown in Fig. 3.

F⁷ indicates a reflecting-screen in the light-chambers, which should be of varying character in accordance with the intensity of the light required, ranging from a white porcelain, where a very intense light is required, to a black velvet, where a light of low intensity is desirable. Access to the light-chambers is afforded by means of doors F⁸ F⁸.

The translucent colored screens are inserted in the chambers F³ F³, and by preference we use a bottle, such as is indicated at H, filled with a translucent colored solution, through which the light is transmitted from the light-chamber F⁶ to the eye of the observer. We have indicated the bottle H as being made of metal with glass windows H² and handle H'. The solution which we prefer to use is an aqueous solution of methyl-orange. That made by the St. Denis Dye Stuff and Chemical Company, Rue Lafayette, Paris, we have found to be well adapted for the purpose, and in varying degrees of dilution it gives the different shades of so-called "reds" and "yellows," which we find to correspond with the emitted light of heated metals. Mixed with the solution we use soluble negrosene in order to modify the shades of red and yellow produced by the methyl-orange and also to regulate the intensity of the light transmitted through the medium, the negrosene, together with the use of varying reflecting-screens, as already described, affording a most satisfactory way of regulating the light intensity.

In using the apparatus above described the pot B is kept full of melted lead, in which is immersed the closed end E' of the tube E, said closed end of the tube attaining precisely the temperature of the lead and having a colored glow visible through the open end of the tube corresponding with the degree of temperature. Translucent colored mediums are placed in the chambers F³ F³, and where both chambers are used the one translucent medium should be such as will emit a light corresponding to a slightly higher temperature than that desired, while the other translucent medium is arranged to emit a light corresponding to a slightly-lower temperature than that desired, the observer then looking through the sight-opening F' sees at the same time the color of the light emitted from the end of the tube E and the colors of the lights emitted from the translucent mediums in the lateral chambers F³ and is able to nicely gage the approach of the heat of the end of the tube E to the desired temperature. In order to control the temperature of the bath, the observer has conveniently accessible the hand-wheel C³, by means of which he can regulate the draft of the furnace heating the lead-pot, and also the hand-wheel D¹⁰, by which he controls the cooling-tube D, plunging it into or withdrawing it from the lead-bath as it is desired to cool the bath or permit its temperature to increase. By one or both of these manipulations it will be evident that the observer can rapidly and nicely regulate the temperature of the bath until it coincides with the desired temperature indicated by the light-emitting mediums. Obviously when the bath has attained the desired temperature a tool or other article immersed in it will be heated to exactly the point desired.

In the modified form of apparatus shown in Fig. 5 the pyrometer box or tube is indicated at $f$, the sight-opening at $f'$, and the colored translucent medium at $h$, the medium in this case occupying one half of the diameter of the tube, while access is given to the other half at the same point by means of a lateral opening $f^{10}$, through which a heated tool or other object, as indicated at J, can be inserted and held alongside of the colored screen by means of tongs I. The space in which the heated metal is to be held is indicated in the figure at $f^3$, and the incandescent electric light by which the light is generated which is transmitted through the screen $h$ is indicated at $g$, K indicating a rheostat by means of which the current transmitted through the filament of the light can be varied at will with a consequent variation in the intensity of the light.

In both of the apparatus described it is obvious that the colored screens may be omitted and the electric light relied upon as a standard of comparison, the rheostat causing the variation in color and intensity of the light emitted from the filament. This mode of using our process has some attractions in that it is a convenient way of determining the temperature of a heated object by varying the color and intensity of the light emitted from the filament until it coincides with that of the object, the relationship of the current to temperature having been previously determined. The same observation can be made by bringing successively into view translucent mediums emitting light of varying color and intensity and all of known relationship to heat colors.

The apparatus shown in Figs. 1 to 4, inclusive, of the drawings, as above described, forms the subject-matter of a separate application for Letters Patent filed by us October 23, 1899, Serial No. 734,456, the present application being entirely independent of the apparatus used and relating solely to the method hereinbefore described, which, it will be readily understood, can be carried into effect in very many and quite different forms of apparatus, those indicated being shown, as we believe, the best adapted for the practical utilization of the new method.

Having now described our invention, what we claim as new, and desire to secure by Letters Patent, is—

1. The herein-described method of ascertaining the temperature of a highly-heated article which consists in comparing the light emitted from said article with the standardized color and illumination of the light emitted from a medium simultaneously in range of vision and having an ascertained relation to temperature.

2. The herein-described method of ascertaining if an article to be annealed or hardened is heated to the right temperature, which consists in comparing the color and intensity of the light emitted from the heated article with the standardized color of the light emitted from a medium and which colored light is the same as that corresponding to the desired temperature of the article to be treated.

3. The herein-described method of ascertaining the temperature of a highly-heated article, which consists in imparting to a light-ray a standardized color and intensity by transmission through and emission from a standardizing medium, and comparing said standardized light-ray with the rays of light emitted from the highly-heated article, the standardized light-ray and the light-ray from the highly-heated article being simultaneously in range of vision.

4. The herein-described method of ascertaining the temperature of a highly-heated article, which consists in transmitting a light-ray through a medium, standardizing the translucency of said medium so that it will impart a standardized color and intensity to the light-ray, and comparing said standardized light-ray with the rays of light from the highly-heated article, the standardized light-ray and the light-ray from the highly-heated article being simultaneously in range of vision.

5. The herein-described method of ascertaining and regulating the temperature of a fused metallic bath or heated receptacle through the intermediacy of a tube closed at one end and open at the other, which consists in imparting to said closed end, the temperature of the bath or receptacle, observing simultaneously the color and intensity of the light emitted from the heated closed end of the tube as seen through the open end thereof, and the standardized color and intensity of a light emitted from a medium also in range of vision, and raising or lowering the temperature of the bath or receptacle until the color and intensity of the lights under observation coincide.

6. The herein-described method of ascertaining and regulating the temperature of a fused metallic bath or heated receptacle, through the intermediacy of a tube closed at one end and open at the other, which consists in imparting to said closed end, the temperature of the bath or receptacle, imparting to a light-ray a standardized color and intensity by transmission through and emission from a standardizing medium, observing simultaneously the two lights, and raising or lowering the temperature of the bath or receptacle until the color and intensity of the lights under observation correspond.

7. The herein-described method of ascertaining and regulating the temperature of a fused metallic bath or heated receptacle, through the intermediacy of a tube closed at one end and open at the other, which consists in imparting, to said closed end, the temperature of the bath or receptacle, transmitting a light-ray through a medium, standardizing the translucency of the medium so that it will impart a standardized color and intensity to said light-ray, observing simultaneously the light from the closed tube end and the standardized light, and raising or lowering the temperature of the bath or receptacle until the color and intensity of the lights under observation coincide.

HENRY L. GANTT.
FREDERICK W. TAYLOR.

Witnesses:
HOWARD S. HESS,
EDWARD J. MALLOY.